United States Patent [19]

Honda et al.

[11] Patent Number: 5,264,523

[45] Date of Patent: Nov. 23, 1993

[54] PROCESS FOR MIXING POLYTETRAFLUOROETHYLENE MOLDING POWDER AND ORGANIC FILLER

[75] Inventors: Norimasa Honda, Ibaraki; Tomohiko Hirata; Hirokazu Yukawa, both of Settsu, all of Japan

[73] Assignee: Daikin Industries Ltd., Osaka, Japan

[21] Appl. No.: 561,425

[22] Filed: Aug. 1, 1990

[30] Foreign Application Priority Data

Aug. 2, 1989 [JP] Japan .................................. 1-200953

[51] Int. Cl.$^5$ .............................................. C08L 83/00
[52] U.S. Cl. ................................ 525/101; 525/104; 525/151; 525/149; 525/146; 525/153; 525/165; 525/178; 525/181; 525/189; 525/276; 524/364; 523/213; 523/210; 523/204; 523/205
[58] Field of Search ............... 524/364; 22/104, 101, 22/151, 149, 146, 153, 165, 178, 181, 189, 296; 523/213, 212, 204, 205

[56] References Cited

U.S. PATENT DOCUMENTS

| | | | |
|---|---|---|---|
| 3,080,258 | 3/1963 | Davis | 523/204 |
| 3,929,721 | 12/1975 | Leverett | 525/104 |
| 3,992,347 | 11/1976 | Vary | 525/101 |
| 4,113,696 | 9/1978 | Williams et al. | 523/213 |
| 4,338,376 | 7/1982 | Kritzler | 525/101 |
| 4,370,436 | 1/1983 | Nakamura et al. | 524/322 |
| 4,647,602 | 3/1987 | Wilczak et al. | 523/204 |
| 4,703,076 | 10/1987 | Mori | 525/101 |
| 4,707,517 | 11/1987 | Bullen et al. | 525/104 |
| 4,724,251 | 2/1988 | Rock | 525/104 |
| 4,960,827 | 10/1990 | Miyazaki et al. | 525/101 |
| 4,985,483 | 1/1991 | Saito et al. | 525/104 |

FOREIGN PATENT DOCUMENTS 53-8649 7/1978 Japan .
56-90862 7/1981 Japan .

OTHER PUBLICATIONS

Derwent Abstract, No. 89-042687 [06], of JP-A 63-314291, Dec. 22, 1988 (Arai Pump Mfg Co.).
Derwent Abstract, No. 86-192294 [30], of JP-A 61-123655, Dec. 11, 1986 (Hitachi Chem. Co.).

*Primary Examiner*—Melvyn I. Marquis
*Assistant Examiner*—Karen A. Dean
*Attorney, Agent, or Firm*—Armstrong, Westerman, Hattori, McLeland & McNaughton

[57] ABSTRACT

A uniform mixture of a polytetrafluoroethylene molding powder and an organic filler, which can provide moldings having improved properties without lowering the appearance and mechanical property, is obtained without sticking the filler to the wall of a mixer by mixing the molding powder and the filler in the presence of a silane coupling agent and a polar solvent, or by previously treating the organic filler with the silane coupling agent and mixing the treated filler with the molding powder.

14 Claims, No Drawings

PROCESS FOR MIXING POLYTETRAFLUOROETHYLENE MOLDING POWDER AND ORGANIC FILLER

BACKGROUND OF THE INVENTION

The present invention relates to a process for mixing a polytetrafluoroethylene molding powder and an organic filler.

The molding powder of polytetrafluoroethylene (hereinafter referred to as "PTFE") is a PTFE powder prepared by finely dividing coarse particles obtained by suspension polymerization, and it has been used for molding by means of compression molding or ram extrusion. The particle size of the finely divided PTFE particles (primary particle size) is 5 $\mu$m at the smallest and is up to about 1,000 $\mu$m. Usually, the particle size is not more than 100 $\mu$m. The PTFE molding powder into which glass beads or powder, glass fiber, carbon, graphite, molybdenum disulfide, bronze powder, or various kinds of heat resistant synthetic resins such as polyimide, polyamideimide and polyphenylene oxide, are incorporated as a filler in order to improve the abrasion resistance, hardness or the like, has also been used as a filled PTFE molding powder. The mixing of the powder and filler can be practiced by a dry mixing method or a wet mixing method.

The PTFE molding powder must be mixed uniformly with the filler, but a difficulty has been encountered in mixing the PTFE powder with organic fillers uniformly by a dry method because the organic filler charges with electricity and sticks to the wall of a mixing machine. The dry method also has the disadvantage that the filler is apt to come off or separate from the mixture and the moldings prepared therefrom may have poor appearance or decreased mechanical strength.

The primary object of the present invention is to provide a process for mixing PTEF molding powder with organic fillers, which can eliminate the above-mentioned problems of conventional process.

The above and other objects of the present invention will become apparent from the description hereinafter.

SUMMARY OF THE INVENTION

It has been found that a uniform mixture of the PTFE molding powder and an organic filler, which can provide moldings having improved properties without lowering the appearance and mechanical strength, is obtained by mixing them with silane coupling agents.

In one aspect of the present invention, there is provided a process for preparing a mixture of a PTFE molding powder and an organic filler which comprises mixing the PTFE molding powder with the organic filler in the presence of a silane coupling agent and a polar solvent.

In another aspect of the present invention, there is provided a process for preparing a mixture of a PTFE molding powder and an organic filler which comprises mixing the PTFE molding powder with an organic filler surface-treated with a silane coupling agent.

DETAILED DESCRIPTION

The process of the present invention is applicable to known PTFE molding powders. PTFE includes, for instance, homopolymer of tetrafluoroethylene (hereinafter referred to as "TFE") and modified PTFE resins, e.g. copolymers of TFE and at most 2% by weight of other monomers copolymerizable with TFE. Representative examples of the other copolymerizable monomers are, for instance, perfluoroolefins having 3 to 6 carbon atoms such as hexafluoropropylene, and perfluoro(alkyl vinyl ethers) having 3 to 8 carbon atoms such as perfluoro(propyl vinyl ether). These modified PTFE resins are not melt-processable as well as TFE homopolymer. These PTFE polymers are used in the form of finely-divided particles having an average particle size of not more than 100 $\mu$m.

Preferably, the organic fillers used in the present invention are heat resistant polymers. Representative examples of the organic fillers are, for instance, aromatic polyester (e.g. polyester commercially available under the trade mark "Echonol" from Sumitomo Chemical Co., Ltd.), polyethersulfone, polyether ether. ketone, polyimide, polyetherimide, polyamideimide, polysulfone, polyphenylene sulfide, polycarbonate, and the like. The average particle size of the organic filler is from 1 to 100 $\mu$m, preferably from 5 to 20 $\mu$m. The organic fillers may be used alone or in admixture thereof.

The mixing ratio of the PTFE powder to the organic filler is usually from 60:40 to 95:5 by weight.

The silane coupling agents used in the present invention are not particularly limited, and known silane coupling agents are applicable to the process of the present invention. In general, these coupling agents are silane compounds which have a hydrolyzable group such as an alkoxyl group or chlorine atom, and an organic functional group containing vinyl group, epoxy group, amino group, mercapto group or the like.

Representative examples of the silane coupling agent are, for instance, vinyltrichlorosilane of the formula:

$$CH_2=CHSiCl_3$$

vinyltris($\beta$-methyoxyethoxy)silane of the formula:

$$CH_2=CHSi(OC_2H_4OCH_3)_3$$

vinyltriethoxysilane of the formula:

$$CH_2=CHSi(OC_2H_5)_3$$

vinyltriemethoxysilane of the formula:

$$CH_2=CHSi(OCH_3)_3$$

$\gamma$-methacryloyloxypropyltriemethoxysilane of the formula:

$$CH_2=\overset{CH_3}{\underset{|}{C}}-COOC_2H_6Si(OCH_3)_3$$

$\beta$-(3,4-epoxycyclohexyl)ethyltrimethoxysilane of the formula:

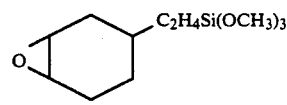

$\gamma$-glycidyloxypropyltriemethoxysilane of the formula:

γ-glycidyloxypropylmethyldiethoxysilane of the formula:

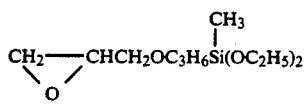

N-β-aminoethyl-γ-aminopropyltriemethoxysilane of the formula:

$H_2NC_2H_4NHC_3H_6Si(OCH_3)_3$

N-γ-aminoethyl-γ-aminopropylmethyldimethoxysilane of the formula:

γ-aminopropyltriethoxysilane of the formula:

$H_2NC_3H_6Si(OC_2H_5)_3$

N-phenyl-γ-aminopropyltriemethoxysilane of the formula:

$C_6H_5NHC_3H_6Si(OCH_3)_3$

γ-mercaptopropyltrimethoxysilane of the formula:

$HSC_3H_6Si(OCH_3)_3$

γ-chloropropyltriemethoxysilane of the formula:

$ClC_3H_6Si(OCH_3)_3$ and the like. Among them, aminosilane coupling agents, particularly γ-aminopropyltriethoxysilane and N-(β-aminoethyl)-γ-aminopropyltrimethoxysilane, are preferred.

The silane coupling agents are used in an amount of 0.001 to 10% by weight, preferably 0.1 to 1.0 by weight, based on the filler. It is preferable to use the silane coupling agents in the form of a solution in a solvent or in the presence of a solvent, because the dispersibility to the fillers is raised. Polar solvents such as ketones and alcohols are preferable as the solvent. For example, acetone, methyl ethyl ketone, isopropyl alcohol, t-butyl alcohol and water are used alone or in admixture thereof. Water containing a small amount of a surfactant, e.g. a 1 to 10% by weight aqueous solution of a surfactant such as anionic surfactant or non-ionic surfactant, can also be suitably used as the solvent in the present invention. The amount of the solvent is usually from 0.001 to 50% by weight, preferably from 0.1 to 10% by weight, based on the organic filler.

In the present invention, the PTFE molding powder and the organic filler are mixed in the presence of the silane coupling agent. Preferably, the mixing is carried out by a process wherein the PTFE powder and the filler are mixed in the presence of the silane coupling agent and the polar solvent, or a process wherein the filler is previously treated with the silane coupling agent and the treated filler is mixed with the PTFE powder. In case of the former process, the order of adding or mixing the respective components is not particularly limited. For example, the PTFE molding powder and the organic filler are successively added to the machine and the silane coupling agent and the polar solvent are then added, and they are mixed. The coupling agent may be in the form of a solution in the polar solvent, and in that case, the PTFE powder, the filler and the solution of the coupling agent are added to the mixing machine, and they are mixed. The PTFE powder may be added to a mixture of the filler and coupling agent, and mixed in the presence of the polar solvent. In case of the latter process, for example, firstly the organic filler is mixed with the silane coupling agent in the presence of the polar solvent so as to perform the treatment of the filler, and to the mixture is added the PTFE powder and they are mixed. The filler treated with the coupling agent can be added to and mixed with the PTFE powder in the absence of the polar solvent.

In the present invention, a mixing machine of agitation type is usually used, e.g. high speed mixer, super mixer or Henschel mixer.

The mixing time (or total mixing time) varies depending on the amounts of the mixture or the respective components used and is not specified, but usually it is from 2 to 30 minutes. The mixing can be carried out at ordinary temperature or higher temperature. During the mixing, the temperature rises to about 70°–80° C. at the highest due to heat generation and the solvent evaporates. This is convenient for the removal of the solvent. In the case that the solvent remains, after the completion of the mixing, the polar solvent is removed, for instance, by filtration, evaporation or other appropriate means.

The mixture obtained according to the process of the present invention may be used directly as a filled molding powder, or may be agglomerated to produce granules in a conventional manner in order to improve the powder flowability.

The present invention is more specifically described and explained by means of the following Examples. It is to be understood that the present invention is not limited to the Examples.

EXAMPLES 1 TO 10

A mixer of agitation type was charged successively with 800 g of a PTFE molding powder (commercially available under the trade mark "Polyflon TFE Molding Powder M12" from Daikin Industries, Ltd.) having an average particle size of about 25 μm, 200 g of an aromatic polyester as the organic filler (commercially available under the trade mark "Echonol" from Sumitomo Chemical Co., Ltd.) having an average particle size of about 25 μm and a solution of 1 g of the silane coupling agent shown in Table 1 dissolved in 100 ml of the solvent shown in Table 1. The mixing was carried out at room temperature for 10 minutes. After the completion of the mixing, uniform mixing property was estimated by the naked eye. Also, the degree of separation of the filler was measured according to the following method.

Degree of Filler Separation

After the completion of the mixing, the resulting mixture was taken out of the mixer, and the organic filler sticking to the wall of the mixer was recovered and weighed. The degree of filler separation was calculated according to the following equation.

$$\text{Degree of filler separation (\%)} = \frac{\text{Amount of sticking filler}}{\text{Amount of filler used}} \times 100$$

The results are shown in Table 1.

EXAMPLE 11

The procedure of Example 1 was repeated except that a polyimide (commercially available under the trade mark "Upylex" from Ube Industries, Ltd.) having an average particle size of 10 μm was used as the organic filler. The results are shown in Table 1.

EXAMPLE 12

The procedure of Example 1 was repeated except that a polyphenylene sulfide (commercially available under the trade mark "Riton" from Phillips Petroleum Co.) having an average particle size of 20 μm was used as the organic filler. The results are shown in Table 1.

EXAMPLE 13

A mixer of agitation type was charged with 13 kg of the same aromatic polyester filler as in Example 1 and a solution of 7 g of γ-aminopropyltriethoxysilane dissolved in 1 liter of acetone, and they were mixed for 10 minutes. To 2 kg of the thus obtained mixture was added 8 kg of the same PTFE powder as in Example 1, and they were mixed for 10 minutes in the mixer. The results are shown in Table 1.

EXAMPLE 14

A mixer of agitation type was charged with 13 kg of the same aromatic polyester filler as in Example 1 and 1.5 g of γ-aminopropyltriethoxysilane dissolved in 1,300 ml of a 3% by weight aqueous solution of a surfactant (commercially available under the trade mark "Nonion HS-208" from Nippon Oil and Fats Co., Ltd.), and they were mixed for 10 minutes. To 2 kg of the thus obtained mixture was added 8 kg of the same PTFE powder as in Example 1, and they were agitated for 10 minutes in the mixer. The results are shown in Table 1.

COMPARATIVE EXAMPLE 1

The procedure of Example 1 was repeated except that the silane coupling agent and solvent were not used. The results are shown in Table 1.

Comparative Example 2

The procedure of Example 1 was repeated except that the silane coupling agent was not used. The results are shown in Table 1.

TABLE 1

|  | Silane coupling agent | Solvent | Uniform mixing property | Degree of separation (%) |
| --- | --- | --- | --- | --- |
| Ex. 1 | γ-Aminopropyltriethoxysilane | acetone | very good | ≦0.001 |
| Ex. 2 | γ-Aminopropyltriethoxysilane | isopropanol | very good | " |
| Ex. 3 | N-β-Aminoethyl-γ-aminopropyl-triethoxysilane | acetone | very good | " |
| Ex. 4 | Vinyltrimethoxysilane | acetone | good | ≦0.005 |
| Ex. 5 | Vinyltriethoxysilane | acetone | good | " |
| Ex. 6 | γ-Methacryloyloxypropyl-trimethoxysilane | acetone | good | " |
| Ex. 7 | γ-Mercaptopropyltrimethoxysilane | acetone | good | " |
| Ex. 8 | γ-Chloropropyltrimethoxysilane | acetone | good | " |
| Ex. 9 | γ-Glycidoxypropyltrimethoxysilane | acetone | good | " |
| Ex. 10 | N-Phenyl-γ-aminopropyltrimethoxysilane | acetone | good | " |
| Ex. 11 | γ-Aminopropyltriethoxysilane | acetone | very good | ≦0.001 |
| Ex. 12 | γ-Aminopropyltriethoxysilane | acetone | very good | " |
| Ex. 13 | γ-Aminopropyltriethoxysilane | acetone | very good | " |
| Ex. 14 | γ-Aminopropyltriethoxysilane | aq. soln. of surfactant | very good | " |
| Com. Ex. 1 | none | none | bad | 0.8 |
| Com. Ex. 2 | none | acetone | bad | 0.8 |

It is observed in Table 1 that the PTFE molding powder can be uniformly admixed with organic fillers without sticking of the fillers to the wall of the mixer according to the present invention.

In addition to the ingredients used in the Examples, other ingredients can be used in the Examples as set forth in the specification to obtain substantially the same results.

What we claimed is:

1. A process for preparing a solid mixture a polytetrafluoroethylene molding powder obtained by suspension polymerization with an organic filler which comprises mixing said molding powder and organic filler in the presence of a silane coupling agent and a polar solvent wherein the organic filler is a heat-resistant polymer powder.

2. The process of claim 1, wherein said silane coupling agent is dissolved in said polar solvent and added to said molding powder and organic filler.

3. The process of claim 1, wherein said silane coupling agent is present in an amount 0.001 to 10% by weight based on said organic filler.

4. The process of claim 1, wherein said polar solvent is present in an amount of 0.001 to 50% by weight based on said organic filler.

5. The process of claim 1, wherein the ratio of said molding powder to said organic filler is from 60:40 to 95:5 by weight.

6. The process of claim 1, wherein said organic filler is a heat resistant polymer having an average particle size of 1 to 100 μm.

7. A process for preparing a solid mixture a polytetrafluoroethylene molding powder obtained by suspension polymerization with an organic filler which comprises mixing said molding powder with an organic filler treated with a silane coupling agent wherein the organic filler, is a heat-resistant polymer powder.

8. The process of claim 7, wherein said mixing is carried out in the presence of a polar solvent.

9. The process of claim 7, wherein said organic filler is mixed with said silane coupling agent in the presence of a polar solvent, and the resulting mixture is mixed with said molding powder.

10. The process of claim 7, wherein said mixing is carried out in the absence of a polar solvent.

11. The process of claim 1, wherein said polar solvent is removed after the completion of the mixing 12. The process of claim 1, wherein said mixing is carried out with removing said polar solvent.

13. The process of claim 7, wherein said polar solvent is removed after completion of the mixing.

14. The process of claim 7, wherein said mixing is carried out with removing said polar solvent.

* * * * *